(No Model.)
C. H. J. DILG.
BALL BEARING.
No. 594,680.  Patented Nov. 30, 1897.
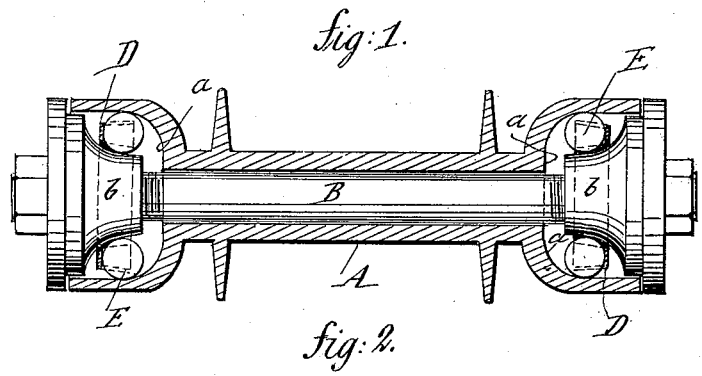
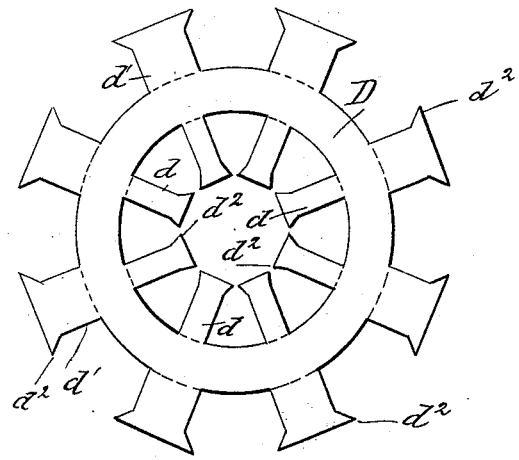
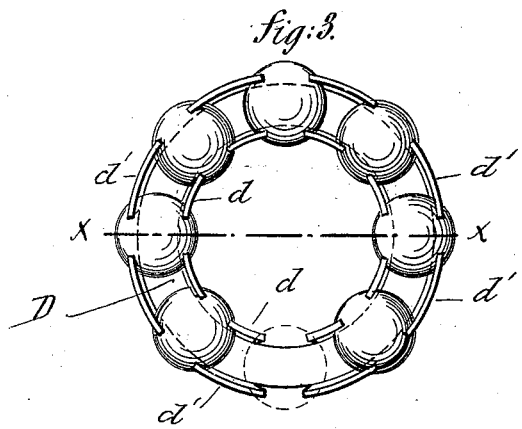
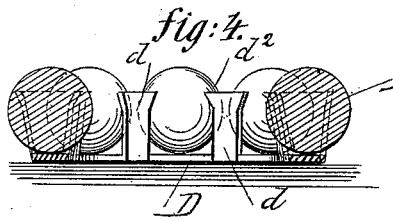
WITNESSES:  INVENTOR

UNITED STATES PATENT OFFICE.

CHARLES H. J. DILG, OF NEW YORK, N. Y., ASSIGNOR TO GUSTAVUS EMIL STRAUSS, OF SAME PLACE.

BALL-BEARING.

SPECIFICATION forming part of Letters Patent No. 594,680, dated November 30, 1897.

Application filed February 15, 1897. Serial No. 623,521. (No model.)

*To all whom it may concern:*

Be it known that I, CHARLES H. J. DILG, a citizen of the United States, and a resident of New York, in the county of New York and State of New York, have invented certain new and useful Improvements in Ball-Bearings, of which the following is a specification.

This invention relates to improvements in ball-bearings; and it consists of a device of a special construction by means of which the balls can be placed simultaneously into the ball-chambers of the bearing and held therein separate from each other, whereby the friction of the balls in the bearing is greatly reduced. This object is accomplished by the construction illustrated in the accompanying drawings, in which—

Figure 1 is a longitudinal section of a hub with my ball holding or retaining device. Fig. 2 shows the flat blank of which the retaining device is made. Fig. 3 is a top view of the device with the balls held therein, and Fig. 4 is a section on line X X of Fig. 3.

The same letters refer to similar parts in all the figures.

A in the drawings designates a hub, and B is the axle of the same, which is provided on each end with a cone $b$, which cones form with the inner flanges $a$ of the hub the ball-chambers, as usual in ball-bearings. D D are my improved ball-holding devices, which are located in the said ball-chambers and carry the balls E in such position that when the axle in the hub is properly adjusted they are in contact with the inner walls of the ball-chambers and can freely revolve therein.

Each ball-holding device consists of a flat ring of sheet metal which is provided with a series of inwardly and outwardly extending flaps $d$ and $d'$, respectively, the flaps $d$ being radially opposite the flaps $d'$, as shown in Fig. 2. The side portions of the flaps are cut out or concave, whereby sharp points $d^2$ on the outer ends of the same are formed. The flaps are then bent upward, so that they stand in right or nearly right angles to the base of the ring and thus form seats for the balls, which latter are placed on the base of the ring and rest thereon in the spaces between the flaps, as shown in Figs. 3 and 4. The flaps hold the balls in position by the outer pointed ends $d^2$ and prevent them from dropping out. The balls revolve freely in the ball-holding device and project from the same in the inner and outer and in the upper directions.

The ball-holding devices are so placed in the ball-chambers that the portions of the balls projecting beyond the inner and outer sides of the devices come in contact with the walls of the ball-chambers, as shown in Fig. 1. The required contact of the balls in the ball-holding device is obtained by proper adjustment of the axle and its cones in the hub, as usual in ball-bearings of this class.

My ball-holding device has the advantage that the balls in the bearings are kept separate from each other, whereby the friction in the bearing, caused by the pressure of the adjoining balls upon each other, is done away with.

In handling the device the balls will not drop from the same, so that the balls can be put in a ball-chamber and removed therefrom all at once.

Having thus described my invention, what I claim as new, and desire to secure by Letters Patent, is—

1. In a ball-bearing, a ball-holding device consisting of a flat ring having a series of inner and a series of outer side flaps radially opposite each other and extending upwardly from the ring, and balls held in the spaces between the inner and outer flaps so that they project beyond the ring and side flaps in the inner and outer and in the upward directions, substantially as set forth.

2. In a ball-bearing, a ball-holding device consisting of a flat ring having inner and outer flaps, radially opposite to each other, the side portions of which are cut out, so that outer sharp points are formed, the flaps being upwardly bent, and balls held in the spaces between the corresponding inner and outer flaps by the said points and projecting beyond the device in the inner and outer and the upper directions, substantially as set forth.

3. The combination of a hub having inner flanges, and an axle having cones, the flanges and cones forming chambers, with ball-holding devices, one in each chamber, which devices each consist of a flat ring having a series of inner and a series of outer side flaps extending upwardly from the ring and having their side portions cut out so that sharp points on their outer ends are formed, and balls held in the spaces between the corresponding inner and outer flaps and projecting beyond the devices in the inner and outer and in the upper directions, substantially as set forth.

Signed at New York, in the county of New York and State of New York, this 20th day of January, A. D. 1897.

CHARLES H. J. DILG.

Witnesses:
ALFRED GISERBERG,
HARRY VILLMER.